United States Patent
Ng et al.

(10) Patent No.: US 9,804,797 B1
(45) Date of Patent: *Oct. 31, 2017

(54) USING DYNAMIC I/O LOAD DIFFERENTIAL FOR LOAD BALANCING

(71) Applicant: EMC IP Holding Company LLC, Hopkinton, MA (US)

(72) Inventors: Timothy C. Ng, Cary, NC (US); Alan L. Taylor, Cary, NC (US); Nagapraveen V. Seela, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 266 days.

This patent is subject to a terminal disclaimer.

(21) Appl. No.: 14/500,885

(22) Filed: Sep. 29, 2014

(51) Int. Cl.
*G06F 3/00* (2006.01)
*G06F 3/06* (2006.01)

(52) U.S. Cl.
CPC .......... *G06F 3/0635* (2013.01); *G06F 3/0613* (2013.01); *G06F 3/0646* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 5,893,922 A | * | 4/1999 | Baylor | G06F 12/0813 711/148 |
| 7,383,463 B2 | * | 6/2008 | Hayden | G06F 11/2069 714/4.11 |
| 9,336,041 B2 | * | 5/2016 | Raja | G06F 3/0635 |

* cited by examiner

*Primary Examiner* — Idriss N Alrobaye
*Assistant Examiner* — Richard B Franklin
(74) *Attorney, Agent, or Firm* — BainwoodHuang (57) ABSTRACT

The subject disclosure is generally directed towards load balancing between storage processors based upon dynamic redirection statistics, in which load balancing includes changing a preferred path/a mounted file system from one storage processor to another. In one example, load balancing technology compares a current delta of directed and redirected I/O counts to a previous delta. If the result turns from negative to positive, that is, redirection is becoming prevalent, a load balancing threshold may be changed based upon the current delta value. Load balancing is thus based on the latest trend of I/O redirection.

15 Claims, 7 Drawing Sheets

USING DYNAMIC I/O LOAD DIFFERENTIAL FOR LOAD BALANCING

BACKGROUND

In a storage array, applications access data by providing input/output (I/O) requests based upon logical unit numbers, or LUNs. In some storage arrays, there is more than one storage processor (SP) that may be in use, typically referred to as SPA and SPB. In such a situation, a LUN has as its default owner either SPA or SPB. If a storage processor fails, the remaining SP takes over the LUNs owned by the failed storage processor, which is referred to as trespassing.

A file system may support multiple LUNs, and some of the LUNs may be owned by a storage processor other than the storage processor on which the file system is mounted. I/Os that are received for LUNs that are not owned by the same storage processor as the one on which the file system is mounted are redirected to the other storage processor. Such redirection causes a performance penalty.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a load balancing technology that uses dynamic I/O load differential to predict I/O redirection trends and adjust load balancing threshold criteria based upon those trends. In one or more implementations, the load balancing technology detects when I/O redirection starts by comparing a current delta of directed and redirected I/O count to a previous delta. If the result turns from negative to positive, a base count is set to the current delta value so that the threshold is not dependent upon (e.g., possibly days of) directed counts, but rather the current trend. This results in load balancing being based on the latest trend of I/O redirection.

It should be understood that any of the examples herein are non-limiting. For instance, one or more examples used herein refer to a middle redirector in a VNX array (from EMC corporation), however this is only one example, and other arrays for data I/O may benefit from the technology described herein. Also, two storage processors are exemplified, however it can be readily appreciated that the technology may be extended to a system with more than two storage processors. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages data storage and computing in general.

Figure 1:
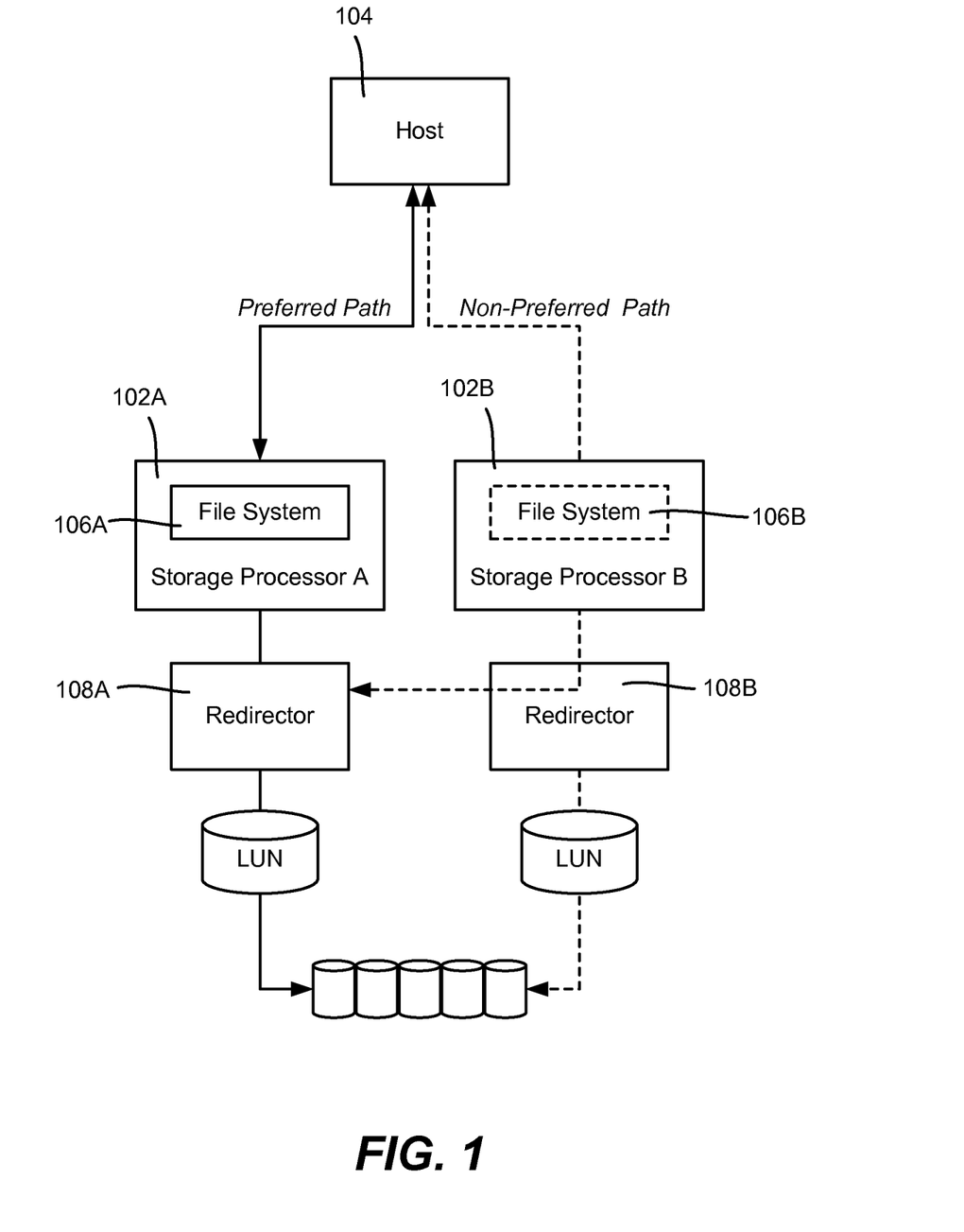
FIG. 1 is a block diagram showing an example configuration of various example components that may be used to perform load balancing based upon dynamic redirection statistics, according to one or more example implementations.

FIG. 1 is a block diagram representing aspects of one implementation of the technology described herein. In FIG. 1, there are two storage processors 102A and 102B depicted, which receive I/O via a host 104. One of the storage processors, that is storage processor 102A in this example, corresponding to the optimal I/O path, has the file system 106A mounted thereon (as indicated by the solid block in contrast to the dashed block indicating "unmounted" file system 106B). As will be understood, in the event of load balancing based upon redirection counts (or other statistics or reasons), the file system will be unmounted from storage processor 102A and mounted on the storage processor 102B.

However, I/O is accepted on any port, and thus a storage processor that does not own a given LUN may receive I/O for another LUN, such as in the event of a path failure. In such a situation, redirection occurs by a redirector component 108A or 108B. As described herein, there may be multiple redirectors in a driver stack, such as an upper redirector, a middle redirector and a lower redirector. For purposes of explanation, a middle redirector is described herein, however it is understood that this is only one example implementation.

Among its operations, the middle redirector (or other suitable component) may keep driver statistics, including, for example, redirection counts. In general, redirection causes relatively poor performance, and thus load balancing may be performed by changing the preferred/non-preferred path including unmounting the file system from the local storage processor and mounting it on the peer storage processor.

Changes to the preferred/non-preferred path may be based on a load balancing policy. If the redirected I/O count exceeds a certain limit then the load balancing policy is invoked and the file system is unmounted from the local storage processor (e.g., 102A) and remounted on the peer storage processor (e.g., 102B).

Note that using a static threshold of delta between the number of directed and redirected I/O counts may be used to trigger LUN trespass to accomplish load balancing between two storage processors. That is, if the delta is greater than the threshold, trespass can be initiated. However among the disadvantages of this static threshold technique is that in long-running, steady-state systems, it may take an extremely long time to react appropriately to a fault that caused redirection. By way of a more specific example, consider that a logical unit is created with I/O written to the preferred path for several days (with no redirection or faults), such that the local I/O count may be on the order of hundreds of millions If a path failure occurs, e.g., a frontend cable to the storage processor where the logical unit was owned is pulled, redirection will start. Although the redirected I/O count then begins to grow, it will typically take days to cause enough redirected I/O trigger movement of the file system. Because of waiting on the difference in the local count and redirected count to surpass the static threshold (e.g., the redirected count minus the local count needs to exceed a delta such as 64K I/Os), it can take days for the delta to reach the threshold. During that time, inefficient redirection is occurring.

Described herein is a using dynamic I/O load differential for load balancing, rather than a static threshold. In one or more implementations, the middle redirector is responsible for redirecting I/Os to the storage processor corresponding to the preferred path, (e.g., on which a VOL_ATTR_PATH_NOT_PREFERRED bit is not set). In case of a file system with multiple LUNs, some of the LUNs may be owned by a storage processor other than the storage processor on which the file system is mounted. For these LUNs, because the preferred path is reported as the storage processor on which the file system is mounted, the middle redirector redirects any received I/O to the preferred path.

If there is significant I/O coming through the redirected path compared to the normal path, then load balancing is performed by notifying the middle redirector about the change in the preferred path so that middle redirector can initiate trespass and transfer the file system to the storage processor on which most of the I/O is received. One such load balancing algorithm is handled as represented in FIGS. 2-6.

The FS Object 302 (FIGS. 3 and 4) maintains an I/O counter to keep track of the number of I/Os received on the file system. The IOC 301 which has a handle to the FS Object 302 notifies the FS Object 302 to increment the count for every I/O received; (note that IOC does not update the count for the I/O generated by MLU fixtures). Once the I/O count reaches the load balancing threshold, the FS Object 302 triggers an event to check if load balancing needs to be performed. As part of this, the FS Object 302 queues an event to the event handler thread 304.

Figure 3:
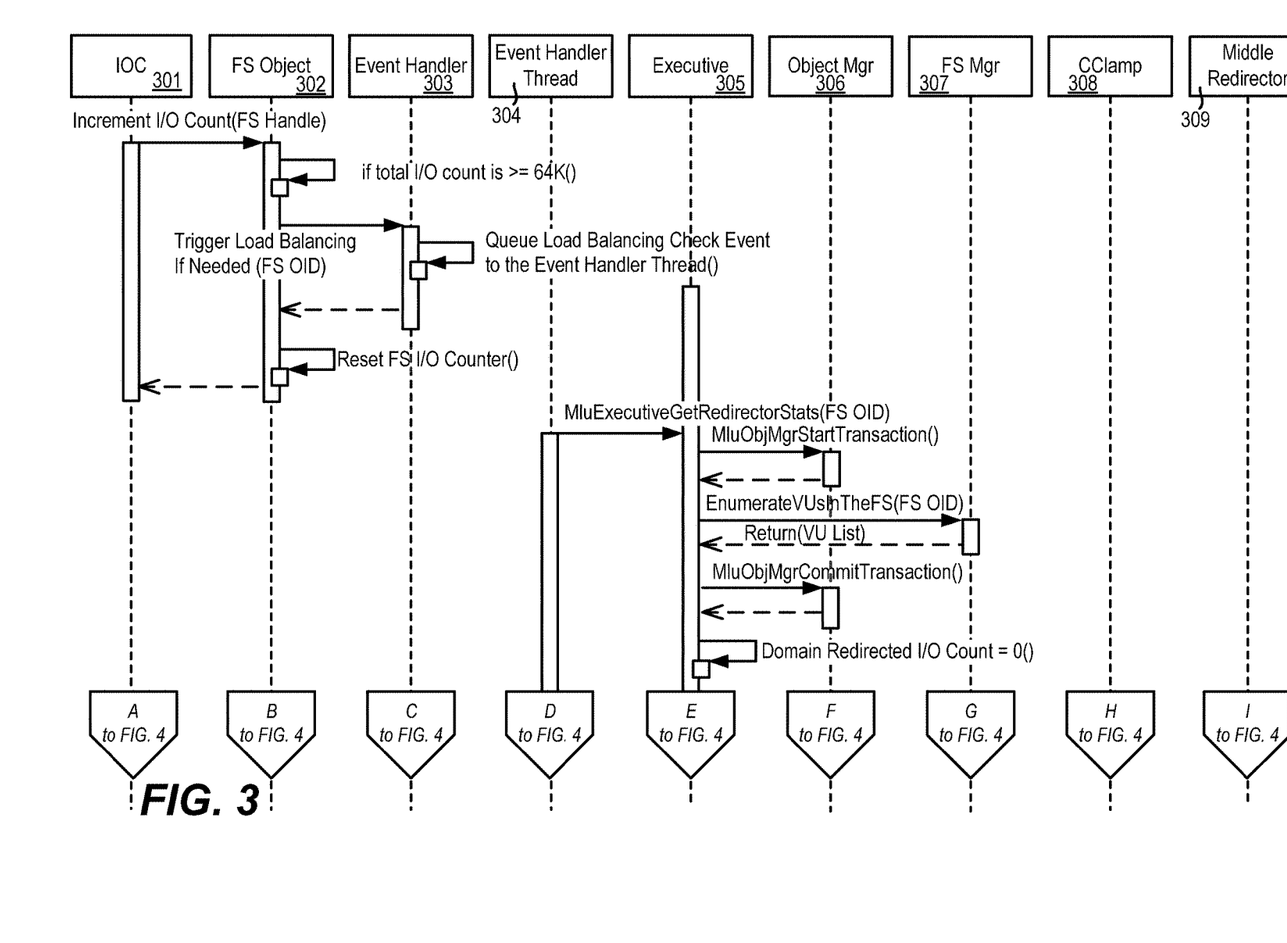
FIGS. 3 and 4 are diagrams representing an example of communication/flow control among components for purposes of load balancing, according to one or more example implementations.
Figure 4:
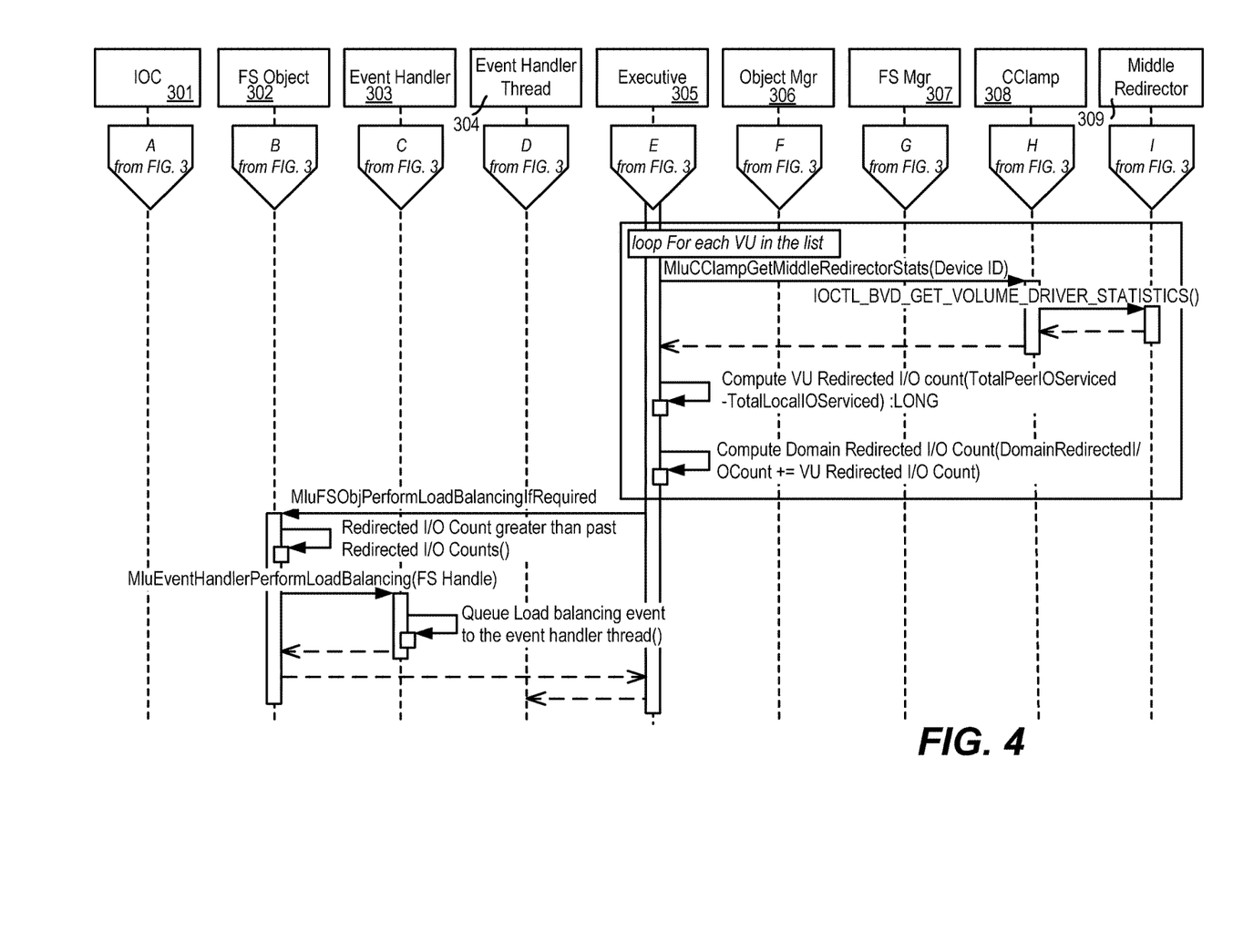

Once the Event Handler thread 304 runs, an Executive 305 walks through the list of VUs in the File System, and for each VU, the Executive 305 notifies CClamp 308 to obtain the Middle Redirector 309 statistics; (note that CClamp is a component responsible for managing the volume event notification I/O request packet, or IRP). CClamp 308 then sends an IO control, (IOCTL_BVD_GET_VOLUME_DRIVER_STATISTICS) an IOCTL, to the Middle Redirector to get the redirector statistics. The Middle Redirector statistics that are of interest to MLU are Total LocalIOServiced and TotalPeerIOServiced. Even though the redirector 309 keeps track of the redirected I/O count for each LUN (delta of Total Peer and Total Local I/O), the Middle Redirector 309 resets these counts whenever the policy engine runs. For this reason the MLU does not use these counts and instead depends on the Total Peer and Local I/O counts in one or more implementations.

The middle redirector policy decision is mainly based on MLU reporting of the preferred versus non-preferred path. Preferred path reporting is done via responding to the IOCTL_FLARE_GET_VOLUME_STATE IOCTL from the Middle Redirector. MLU sets the VOL_ATTR_PATH_NOT_ PREFERRED Volume attribute bit to indicate that a storage processor is not the preferred storage processor. On the preferred storage processor, this bit is not set.

MLU reports the allocation storage processor of the file system as the preferred path and the peer storage processor as the non-preferred path. The VU Object has a new non-persistent property "IsPreferredPath" flag that tells whether that storage processor is the preferred path for that VU or not. This VU Object flag is used during Get Volume State processing to report the path preference.

Once the Middle Redirector statistics are obtained, the Executive 305 computes the VU redirected I/O count by computing the delta of peer and local I/O counts. The Executive 305 then computes the domain redirected I/O count by adding up the redirected I/O counts of VUs in the domain.

Figure 2:
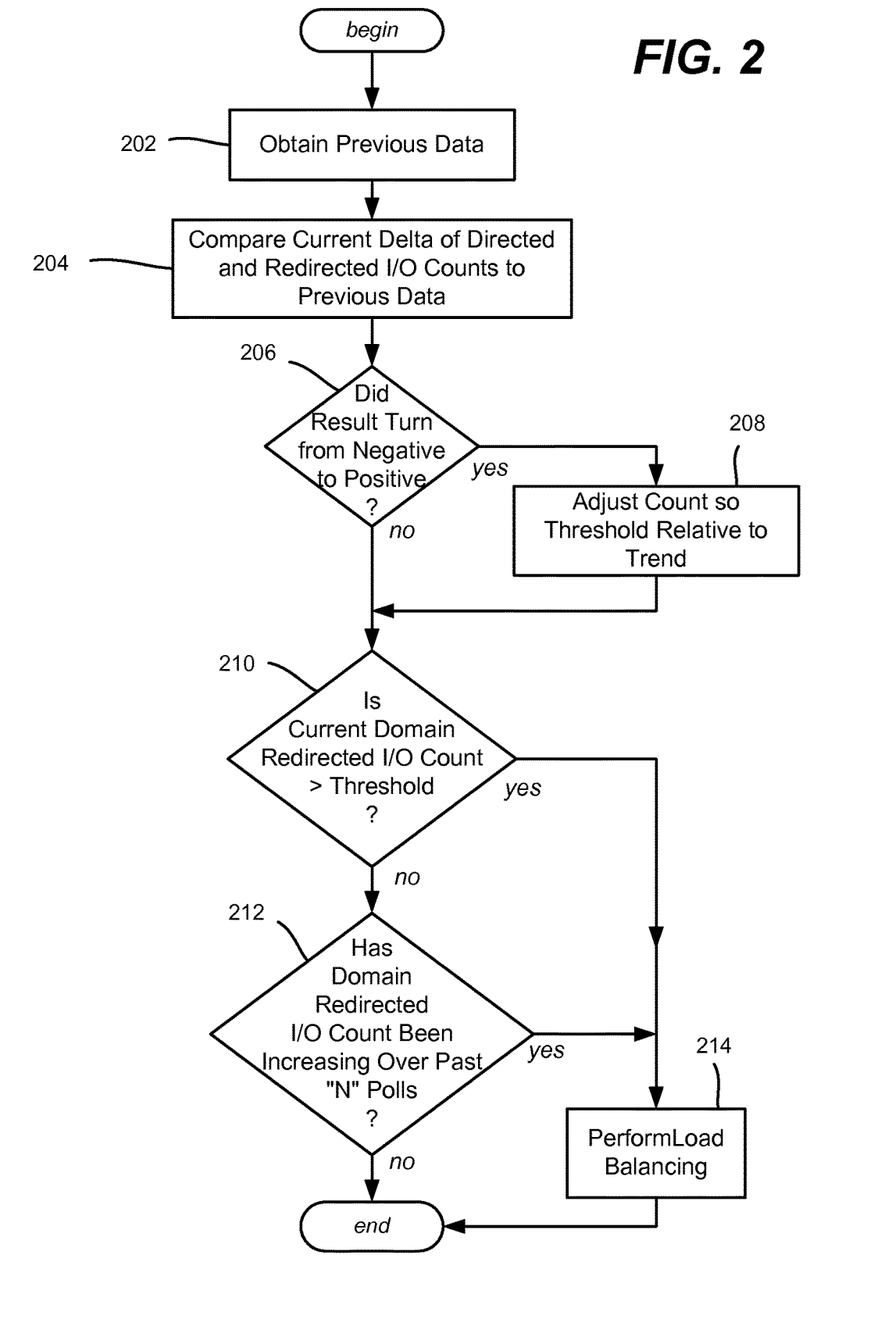
FIG. 2 is a flow diagram showing example steps that may be taken in performing load balancing based upon dynamic redirection statistics, according to one or more example implementations.

The Executive 305 then notifies FS Object 302 to check if load balancing needs to be performed, as generally represented in the example steps of FIG. 2. Note that FS Object 302 maintains "N" entries of past domain redirected I/O count data, which is represented by step 202 of FIG. 2.

FS Object 302 makes the load balancing decision based on the past data and the current domain redirected I/O using the evaluations at steps 210 or 212. If (step 210) the Current Domain Redirected I/O count is greater than threshold (e.g., 64K) then load balancing needs to be performed at step 214. If (step 212) the Domain Redirected I/O count is not greater than the threshold but the domain redirected I/O count has been increasing over the past "n" polls then load balancing needs to be performed at step 214.

FS Object 302 maintains the past redirected I/O counts instead of depending only on the current domain redirected I/O count to make sure that the load balancing decision is not influenced by past I/O patterns. For example, consider that some domain D exists with LUNs owned across both the storage processors. Previously, most of the I/O is received on the LUNs that are owned by the same storage processor on which the file system is mounted. This results in Total LocalIOServiced to be greater than the TotalPeerIOServiced and the domain redirected I/O count is negative (as evaluated via steps 204 and 206).

Later, consider that in this example there is a change in the I/O pattern with most of the I/Os received on the LUNs owned by a storage processor other than the storage processor on which the file system is mounted. Even though the file system services more redirected I/O than the local I/O, the domain redirected count still remains negative because of the past Local I/O data.

If the policy decision is based on just the current redirected I/O count, then load balancing will not happen in the above case for a long time even though more I/O is getting redirected. In order to avoid the above scenario, a poll is taken (e.g., every 100 mS or on some number of I/Os) so that if the result turns from negative to positive at step 206, at step 208 the threshold evaluation is based upon the trend rather than simply the delta, e.g., whether the redirection count when considering the total count as a base count exceeds the threshold, (rather than the delta plus the threshold), e.g., T2−T1>64K; that is, the redirection count is considered as starting upon the change from negative to positive, which can quickly reach the threshold in the event of a path failure. FS Object 302 takes the past redirected I/O count(s) into account while making the load balancing decision.

If FS Object 302 determines that load balancing needs to be performed then it queues an event to the Event handler 303 to perform load balancing and returns back to the Executive 305. In this situation, the Executive 305 notifies the VU about the change in the preferred path and the flag in the VU Object is set appropriately.

Figure 5:
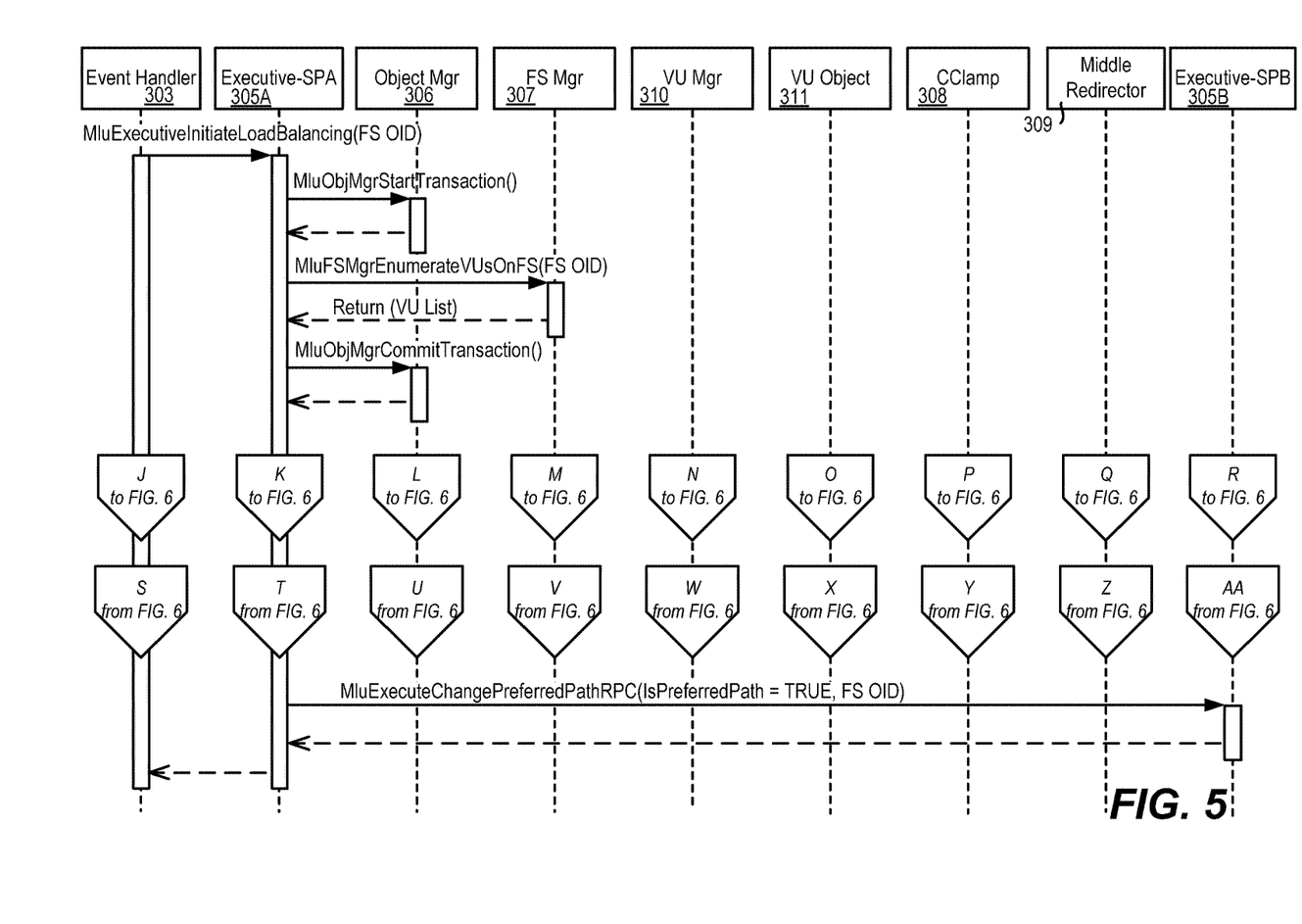
FIGS. 5 and 6 are diagrams representing an example of communication/flow control among components for purposes of load balancing, according to one or more example implementations.
Figure 6:
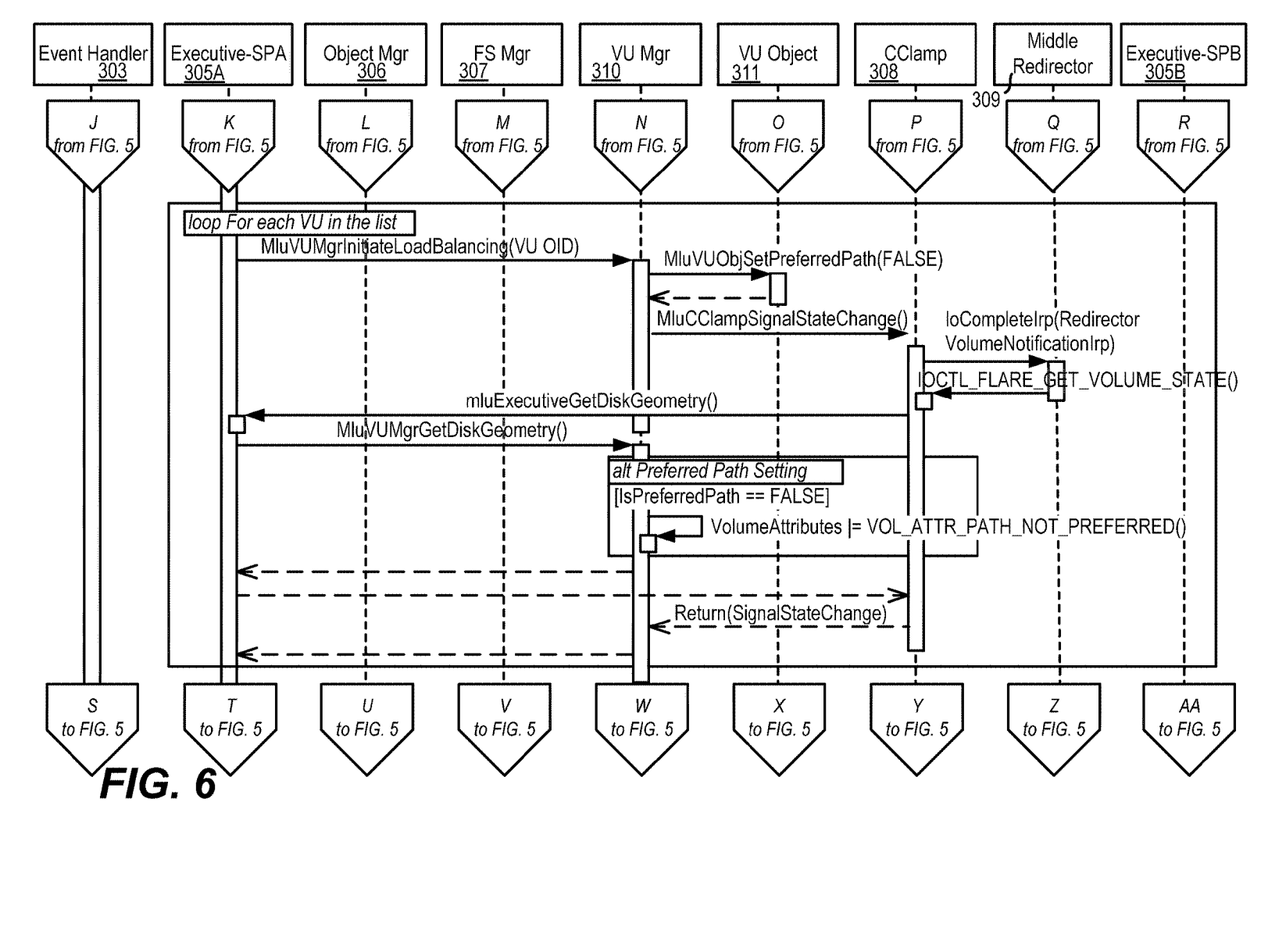

As represented in FIGS. 5 and 6, once the event handler 303 runs the load balancing event, the Executive (e.g., 305A) queries the FS Manager 307 to enumerate the list of VUs on the file system. The Executive 305A then walks through the list of VUs and notifies the VU Manager 310 to initiate load balancing by passing in the VU OID of the VU object 311. The VU Manager 310 then notifies the VU Object 311 to clear the "IsPreferredPath" flag stored in the VU Object's non-persistent area so that change in path preference will be reported to the Middle Redirector 309 while processing the next Get Volume State request. The VU Manager 310 then notifies CClamp 308 to the signal state change to the Middle Redirector 309. CClamp 308 then completes the Middle Redirector's hanging IRP "IOCTL_REDIRECTOR_REGISTER_FOR_VOLUME_EVENT_NOTIFICATION" to notify the Middle Redirector 309 about the state change. Upon completion of the IRP, the Middle Redirector 309 sends a Get Volume State request and the VU Manager 310 responds to the request by setting the volume attribute "VOL_ATTR_PATH_NOT_PREFERRED". This causes the Middle Redirector 309 policy engine to run. However, in this example the Middle Redirector 309 notices that both storage processors are reporting "path not preferred" for the LUN and does not perform any ownership transfer action. After the Get Volume State information is sent (via an IOCTL), the VU Manager 310 returns the status of the load balancing operation to the Executive 305A.

The Executive 305A then sends a message to the peer Executive 305B to set the peer storage processor as the preferred path for the file system. Upon receiving the message, the peer Executive 305B performs the above load balancing actions with preferred path set as TRUE. When the Middle Redirector 309 policy engine runs after the completion of the Get Volume State IOCTL, the Middle Redirector 309 notices that the peer storage processor is the preferred path for the LUN and initiates a Middle Redirector failback operation by trespassing the LUN to the current preferred storage processor 305B.

If the peer storage processor 305B to which the ownership needs to be transferred dies after MLU changes the local storage processor path as not preferred and before the message to the peer storage processor 305B to set the preferred path is sent, then MLU ends up reporting both the storage processors as non-preferred paths and the Middle Redirector 309 does not perform any ownership transfer. Eventually during the next poll, the file system will notice that the domain redirected count is higher and triggers load balancing again.

Note that a "FailIOsWithSyncRequired" disposition is used in the CClamp I/O disposition. CClamp fails any incoming I/Os and queued I/Os on a logical volume with STATUS_SYNCHRONIZATION_REQUIRED if this disposition is set for that logical volume. MLU uses this disposition to notify the Middle Redirector to initiate trespass of a LUN from the SP failing I/Os with STATUS_SYNCHRONIZATION_REQUIRED to the peer SP.

Example Computing Device

The techniques described herein can be applied to any device or set of devices capable of running programs and processes, such as the any of the components of FIGS. 1-6. It can be understood, therefore, that handheld, portable and other computing devices and computing objects of all kinds including cell phones, tablet/slate computers and the like are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
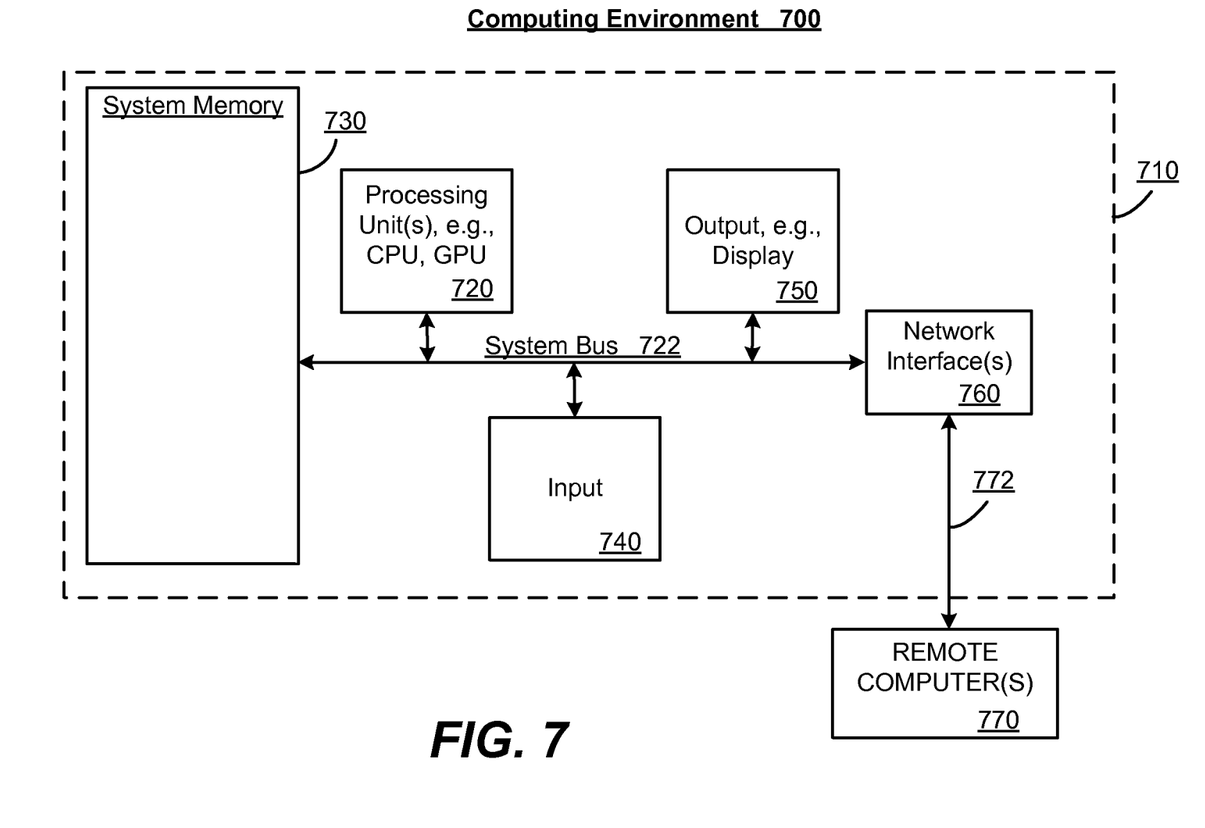
FIG. 7 is a block diagram representing an example computing environment into which aspects of the subject matter described herein may be incorporated.

FIG. 7 thus illustrates an example of a suitable computing system environment 700 in which one or aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of machine/computer-readable media and can be any available media that can be accessed by computer 710. The system memory 730 may include computer storage media in the form of volatile and/or nonvolatile memory such as read only memory (ROM) and/or random access memory (RAM), and hard drive media, optical storage media, flash media, and so forth. By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method in a computer network or computer system, comprising, using dynamic redirection statistics to determine whether to perform load balancing, and if so, performing load balancing by changing a preferred path from a first storage processor to a second storage processor, including to unmount a file system from the first storage processor and mount the file system on the second storage processor and notify a redirector of the preferred path changing from the first storage processor to the second storage processor.

2. The method of claim 1 wherein using the dynamic redirection statistics comprises maintaining current directed I/O counts and current redirected I/O counts, computing a delta between current directed I/O counts and current redirected I/O counts, and comparing the delta against previous data.

3. The method of claim 1 wherein using the dynamic redirection statistics comprises evaluating a current redirected I/O count against a threshold value, and performing load balancing if the current redirected I/O count achieves the threshold value.

4. The method of claim 1 wherein using the dynamic redirection statistics comprises determining whether a current redirected I/O count is increasing over one or more prior polls, and if so, performing load balancing.

5. A system comprising, one or more processors and a memory, the memory configured to contain executable code executed by the one or more processors, including code corresponding to a redirector, the redirector configured to redirect I/O requests to a LUN that is not owned by a storage processor corresponding to a preferred path and having a file system mounted thereon, and to provide dynamic statistics on directed and redirected I/O requests, the redirector further configured to participate in load balancing, including to change the preferred path to another storage processor based upon the dynamic statistics.

6. The system of claim 5 wherein the statistics include at least one current redirection count.

7. The system of claim 5 wherein the statistics include at least one total redirection count.

8. The system of claim 5 wherein the statistics include at least one non-redirected count.

9. The system of claim 5 wherein the statistics include past redirection data.

10. The system of claim 5 wherein the code is configured to change to the preferred path to the other storage processor including to mount an instance of a file system on the other storage processor.

11. One or more non-transitory machine-readable storage media having machine-executable instructions, which when executed perform steps, comprising:
    maintaining dynamic statistics with respect to I/O requests directed to a first storage processor and I/O requests redirected to a second storage processor;
    accessing the dynamic statistics to determine whether the I/O requests redirected to the second storage processor indicate that load balancing is likely to increase performance; and
    if load balancing is likely to increase performance, performing load balancing, including unmounting a file system from the first storage processor and mounting a file system on the second storage processor, and directing I/O requests to the second storage processor.

12. The non-transitory machine-readable storage media of claim 11 having further machine-executable instructions comprising, redirecting I/O requests to the first storage processor.

13. The non-transitory machine-readable storage media of claim 11 wherein maintaining the dynamic redirection statistics comprises maintaining current directed I/O counts and current redirected I/O counts.

14. The non-transitory machine-readable storage media of claim 11 wherein maintaining the statistics comprises evaluating a redirected I/O count against a threshold value, and performing load balancing if the current redirected I/O count achieves the threshold value.

15. The non-transitory machine-readable storage media of claim 11 wherein accessing the dynamic statistics to determine whether the I/O requests redirected to the second storage processor indicate that load balancing is likely to increase performance comprises determining whether a current redirected I/O count is increasing over one or more prior polls, and if so, performing load balancing.

* * * * *